Jan. 31, 1933. G. AURIEN ET AL 1,895,779
METHOD AND APPARATUS FOR CROSS CUTTING WIRE GLASS
Filed July 10, 1929 4 Sheets-Sheet 3
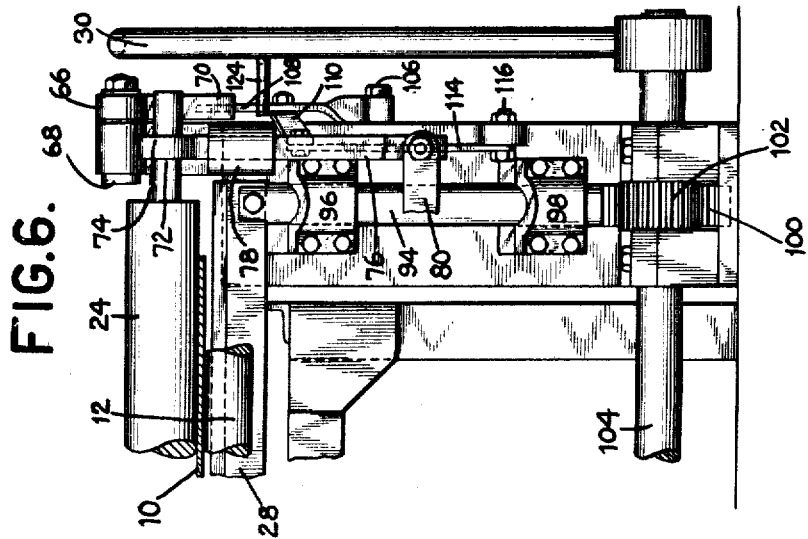
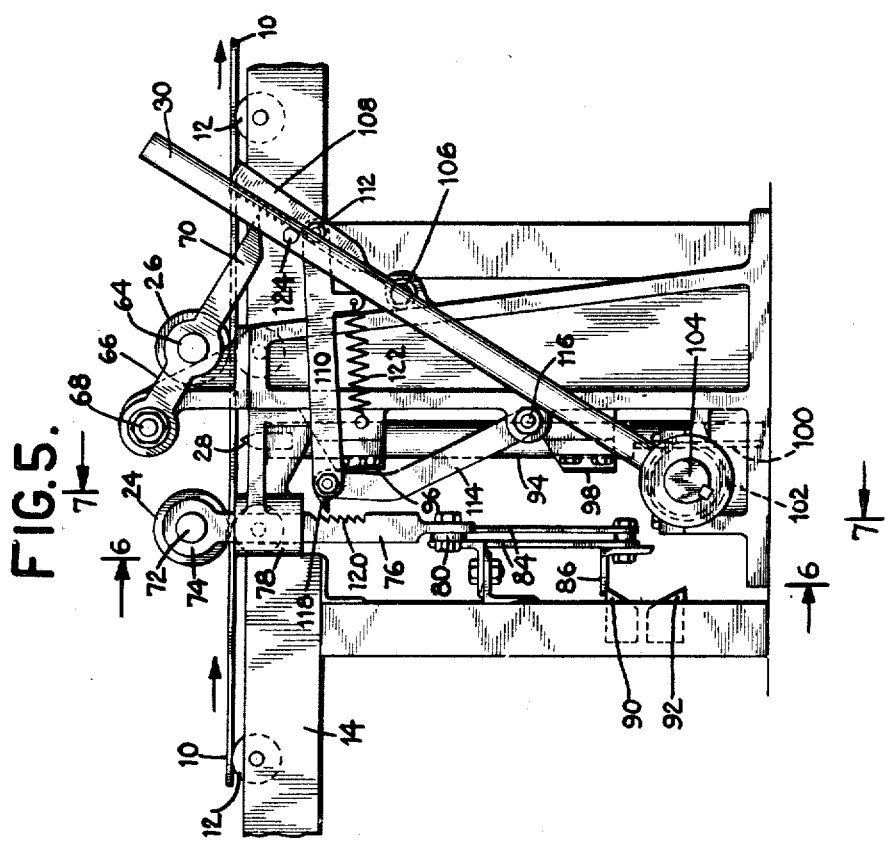
Inventors
Geo. Aurien
P. J. Gutmann
By their Attorneys
Cooper, Kerr & Dunham

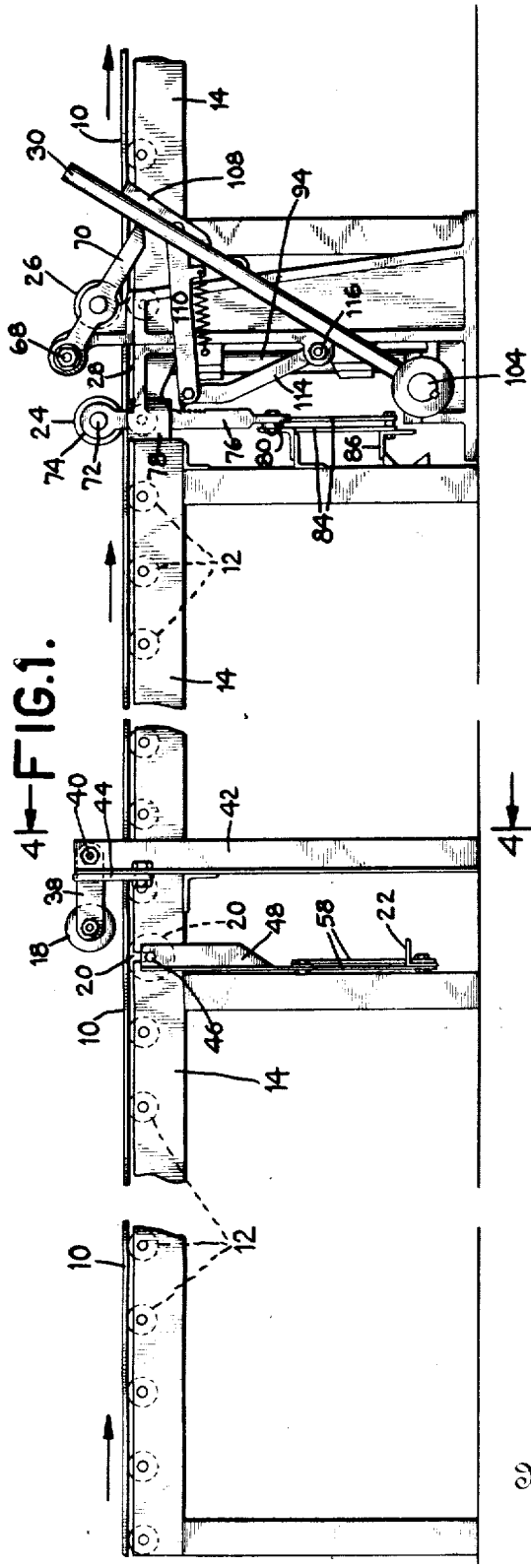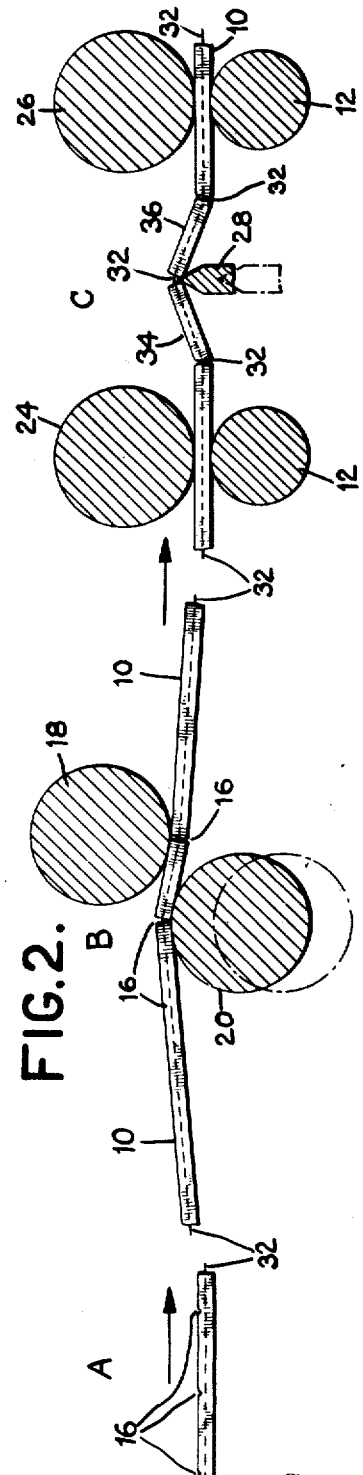

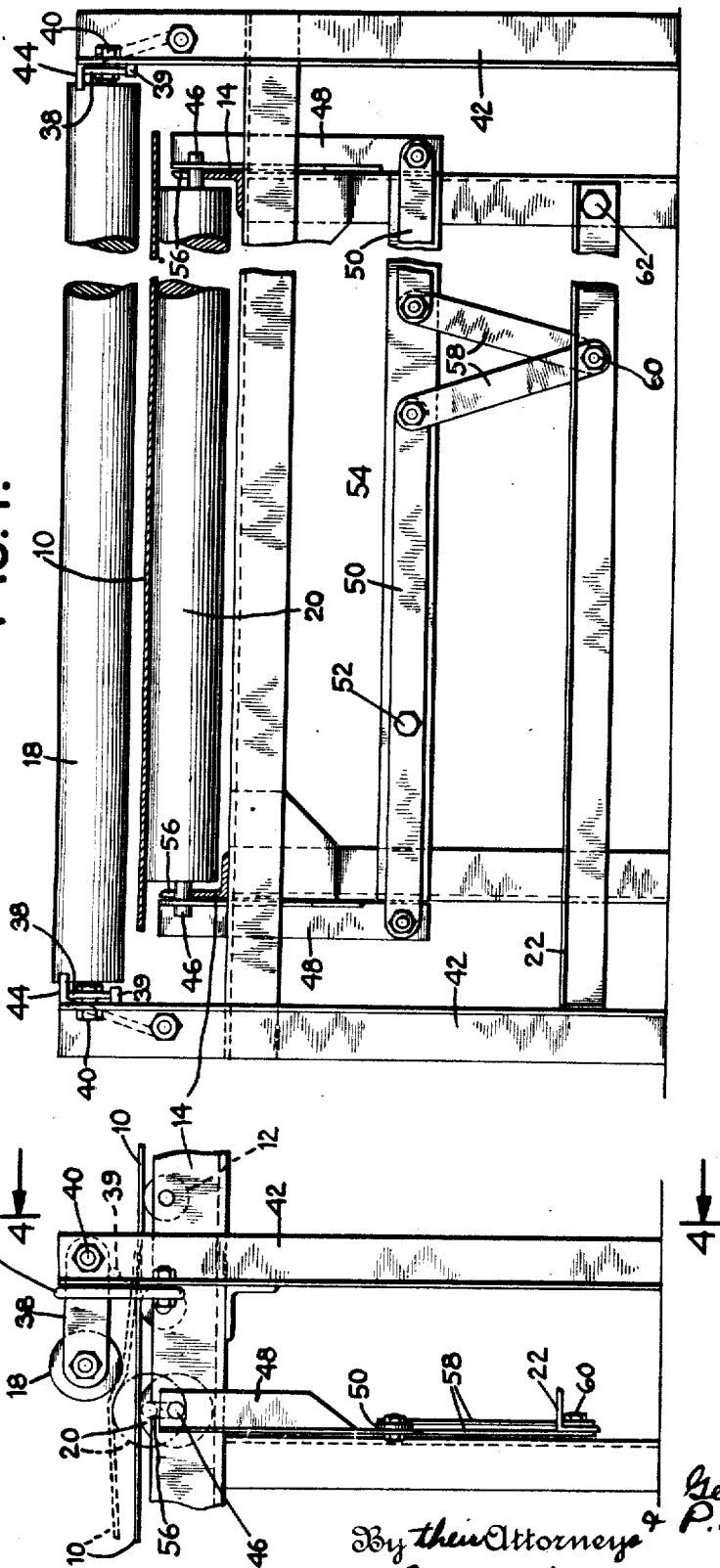

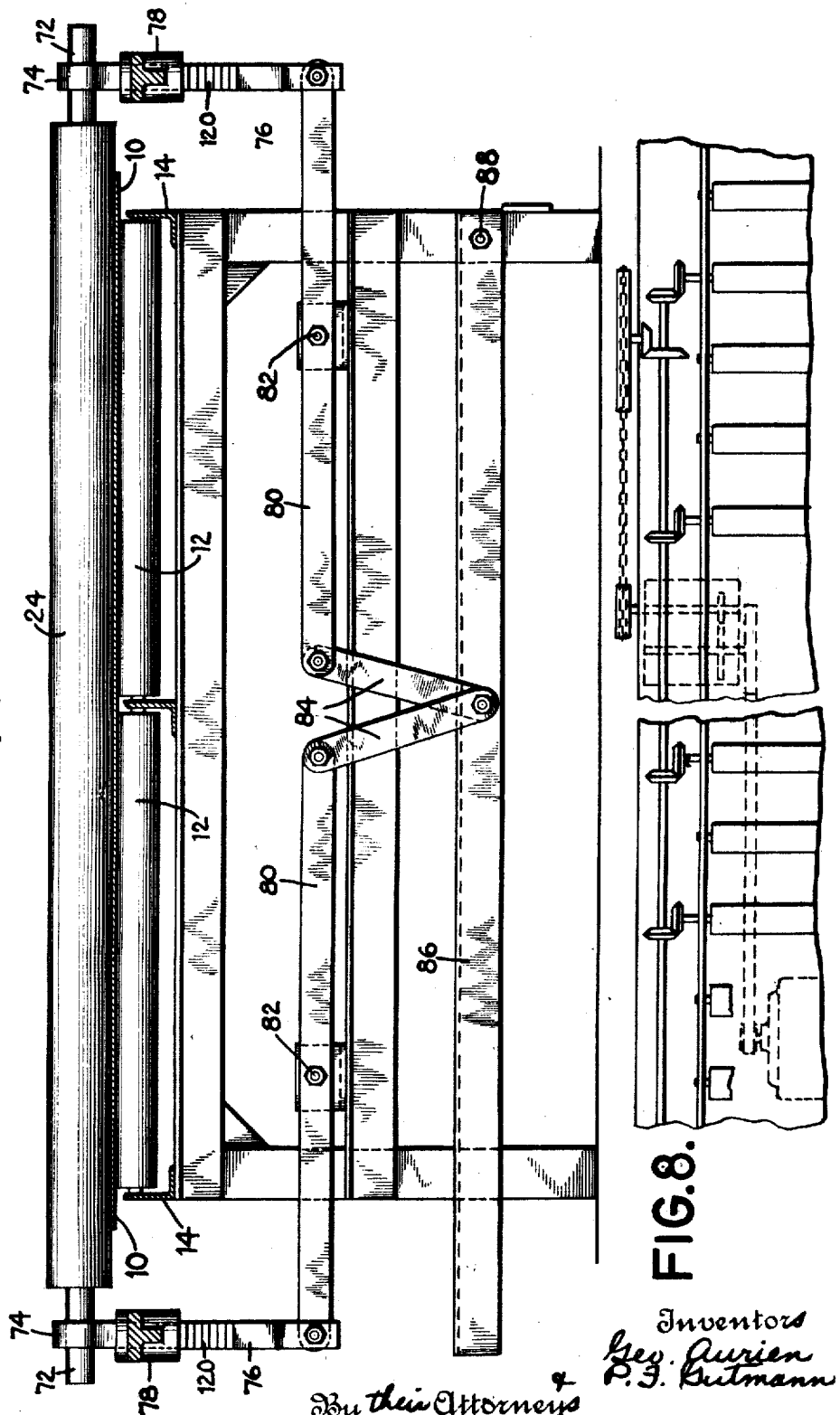

Patented Jan. 31, 1933

1,895,779

UNITED STATES PATENT OFFICE

GEORGE AURIEN AND PAUL F. GUTMANN, OF ST. LOUIS, MISSOURI, ASSIGNORS TO MISSISSIPPI GLASS COMPANY, OF NEW YORK, N. Y., A CORPORATION OF NEW YORK

METHOD AND APPARATUS FOR CROSS CUTTING WIRE GLASS

Application filed July 10, 1929. Serial No. 377,090.

In the manufacture of wire glass by the continuous process, the wide ribbon of glass passes from the forming rolls to the leer and after emerging from the leer is cross cut into sheets of desired lengths. In the cross cutting operation the cutting of the glass itself offers no difficulty, but the cutting or breaking of the wire has been a problem.

The principal object of this invention is to disclose apparatus and method which have solved the problem. The glass is first scored by a diamond cutting tool in a plurality of parallel lines, then the glass is broken at those lines, and finally the operation is completed by breaking the wire as will be disclosed.

Further and other objects and advantages will be apparent from the specification and claims, and from the drawings which illustrate what is now considered the preferred embodiment of the invention.

Fig. 1 is a front view of the apparatus, with a ribbon of glass passing therethrough from left to right.

Fig. 2 is a diagrammatic view showing the three steps of the method.

Fig. 3 is an enlarged detail of the glass breaking apparatus of Fig. 1 with the parts in different positions.

Fig. 4 is an enlarged view on the line 4—4 of Fig. 3 and Fig. 1.

Fig. 5 is an enlarged view of the wire breaking apparatus of Fig. 1.

Fig. 6 is a view on line 6—6 of Fig. 5.

Fig. 7 is a view on the line 7—7 of Fig. 5.

Referring to Figs. 1 and 2, the continuous ribbon of glass 10 is passing from left to right on rollers 12, mounted in frame or bench 14. As the ribbon approaches the cutting station an operator, with a familiar diamond tool, scores the glass crosswise in three closely spaced parallel lines, as at 16. As is well known, sheet glass after being so scored is easily fractured along the scored line if subjected to a bending strain. It has been found in practice that a spacing of three or four inches between the scored lines gives good results.

After being scored the glass moves along to the glass breaking apparatus comprising an upper roller 18 in fixed bearings, and a lower roller 20 which may be raised by the foot of the operator from the dotted to full line position of Fig. 2, thus causing the glass to follow a somewhat tortuous path between rollers 18 and 20. The effect has been somewhat exaggerated in the drawings for clarity of illustration, but in any event the action is sufficient to fracture the glass on the scored lines. In performing the operation the operator raises roller 20 by depressing foot lever 22 when the scored lines reach the roller, and lowers the roller again as soon as they have passed.

After the glass is fractured as above described, the ribbon continues to move over rollers 12 until the wire breaking portion of the apparatus is reached, comprising upper rollers 24 and 26 and breaker bar 28 having a V shaped upper edge. The mechanism for controlling the rollers and bar will be fully described, but it is sufficient for the present discussion to know that when the middle one of the glass fractures is over bar 28 the operator manipulates lever 30 to raise bar 28 from dotted to full line position as indicated in Fig. 2. Since the wire 32 is embedded in the glass the wire has no opportunity to elongate at the lines of glass fracture with the result that when bar 28 is raised the wire is certain to break at one or more of the lines of glass fracture. If the wire is central in the glass, breakage will usually occur at all three places. If the wire is above the center of the glass it will certainly break at the middle glass fracture and may or may not break at the others. If the wire is below the center of the glass it may not break at the middle glass fracture but will certainly break at the others. The raising of bar 28 is only momentary. After it has performed its operation the completely severed sheets of glass move farther along on rollers 12 and operators remove and discard the narrow glass strips 34, 36 and the cross cutting operation is complete.

For convenience, the three essential steps of the method, scoring, glass fracturing, and wire breaking, have been designated A, B and C, respectively, in Fig. 2.

Figs. 3 and 4 show details of the mechanism for performing glass fracturing operation B. Roller 18 is mounted for rotation in the ends of horizontal links 38 pivoted at 40 on the upper ends of uprights 42. Hooks 44 engaging links 38 serve to hold them against pins 39 and prevent vertical movement of rollers 18. Hooks 44 may be swung back and links 38 raised if roller 18 is not being used, as for instance if glass other than wire glass is being handled. Roller 20 has trunnions 46 projecting from its ends. These trunnions are supported for rotation in the upper ends of vertical links 48, the lower ends of which are attached to horizontal levers 50 pivoted at 52 on frame member 54. Slots 56 in members 14 serve to guide trunnions 46 vertically. The inner ends of levers 50 are connected by links 58 at 60 to the foot lever 22, pivoted to the frame at 62. With the above mechanism in mind it is readily apparent that depression of lever 22 by the operator will raise roller 20 to perform operation B.

Referring now to Figs. 5, 6 and 7 the construction of the wire breaking apparatus may be learned. The glass ribbon, especially along its edges, sometimes has imperfections which are thicker than the ribbon. It is therefore necessary to provide means permitting the raising of rollers 24 and 26 to allow the imperfections to pass, but permitting the locking of the roller in operative positions during the wire breaking operation. During the wire breaking operation it sometimes happens that strips 34 or 36, or both of them are turned over to lie on top of glass sheet 10 and must pass under roller 26. To meet such a condition roller 26 is supported in bearings 64 on inclined arms 66 pivoted on the frame at 68 so that the roller may normally rise automatically to pass material of unusual thickness approaching from the left. Arms 66 are provided with downwardly extending projections 70 which are used to lock rollers 26 in position when operation C is to occur.

Roller 24 is provided at its ends with trunnions 72 supported for rotation in bearings 74 at the upper of vertical bars 76 guided for vertical movement in frame brackets 78. The lower ends of bars 76 are pivotally connected to ends of horizontal levers 80 pivoted on the frame at 82 and connected by links 84 to foot lever 86, pivoted on the frame at 88. Latches 90 and 92, fast on the frame, serve to hold lever 86 in elevated or depressed position if the operator so desires.

If the operator observes a defect in the approaching glass ribbon he depresses lever 86 and holds roller 24 elevated until the imperfection passes. If the roller is not in use, as for instance when wire glass is not being handled, roller 24 is held in elevated position by locking lever 86 under latch 92.

Breaker bar 28 is mounted at its ends on the upper ends of vertical bars 94 guided for vertical movement by bearings 96 and 98 on the frame. The lower end of each bar 94 is provided with a rack 100, with which is enmeshed the teeth of a pinion 102 fast on shaft 104, to the front end of which shaft is attached the lower end of lever 30. It is clear that whenever lever 30 is moved from right to left breaker bar 28 will be raised.

In order to lock rollers 24 and 26 in operative position the following devices are provided. Pivoted on the frame at 106 is an upwardly extending arm 108, with notches on one edge adapted to engage the pointed end of arm 70. A horizontal link 110, pivoted at 112 on arm 108, is supported at its other end, adjacent vertical rod 76, on the upper end of vertical link 114, pivoted on the frame at 116. The end of link 110 is pointed with a prong 118 to engage notches 120 on rod 76.

A spring 122 urges link 110, and arm 108, toward the left, but the parts are normally held in the position shown in Fig. 5 by pin 124 projecting rearwardly from lever 30 and engaging arm 108 to hold it and link 110 in positions shown, in which positions rollers 24 and 26 are free to rise or be raised.

When the operator desires to perform the wire breaking operation C he moves lever 30 rapidly to the left and then back to the right. The instant movement to the left begins, pin 124 releases arms 108 whereupon spring 122 draws the teeth of arm 108 into engagement with the pointed end of arm 70, and prong 118 engages teeth 120 of bar 76, thus locking rollers 26 and 24 against upward movement. Further movement of lever 30 then causes pinions 102 to raise breaker bar 28 to the full-line position of Fig. 2. Return of arm 30 to normal position at the right drops the breaker bar and again releases the rollers, as in Fig. 5.

It will be understood that many of the parts above described are duplicated at the rear of the machine, in order to properly control both ends of the rolls, and so forth.

It is to be understood that the invention is not limited to the specific constructions herein described but may be used in other ways without departure from its spirit as defined by the following claims.

We claim—

1. In the method of cross cutting sheet wire glass, the steps of cross scoring the surface of the sheet in a plurality of closely spaced parallel lines intermediate its ends, fracturing the glass at the scored lines, and breaking the wires along the line of at least one of the glass fractures while maintaining the portions of the sheet on opposite sides of the lines in a substantially common plane.

2. In the method of cross cutting sheet wire glass, the steps of cross scoring the surface of the sheet in a plurality of closely spaced parallel lines intermediate its ends, applying bending strains to fracture the glass at the scored lines, and then breaking the wires along the line of at least one of the glass fractures while maintaining the portions of the sheet on opposite sides of the lines in a substantially common plane.

3. In the method of cross cutting sheet wire glass, the steps of cross scoring the surface of the sheet in a plurality of closely spaced parallel lines intermediate its ends, applying bending strains to fracture the glass at the scored lines whereby a plurality of strips of glass are formed, and then breaking the wires between said strips while maintaining the portions of the sheet on opposite sides of the lines in a substantially common plane.

4. In the method of cross cutting sheet wire glass, the steps of cross scoring the surface of the glass in a plurality of closely spaced parallel lines, applying bending strains to fracture the glass at the scored lines whereby a plurality of strips of glass are formed, and then displacing the strips from the plane of the glass sheet to simultaneously break the wires at the glass fractures.

5. In the method of cross cutting sheet wire glass, the steps of cross scoring the surface of the sheet in three closely spaced parallel lines, fracturing the glass at said lines to divide the sheet into successive sheets, and breaking the wires at the fractures while holding the successive sheets in alignment.

6. In the method of cross cutting sheet wire glass, the steps of cross scoring the surface of the sheet in three closely spaced parallel lines, applying bending strain to fracture the glass at the scored lines whereby two narrow strips of glass are formed between successive sheets of glass dividing said sheet into successive sheets, and then breaking the wires along the line of at least one of the glass fractures while holding said successive sheets in alignment.

7. In the method of cross cutting sheet wire glass, the steps of cross scoring the surface of the sheet in three closely spaced parallel lines, applying bending strain to fracture the glass at the scored lines whereby two narrow strips of glass are formed between successive sheets of glass, and then simultaneously displacing the strips from the plane of the glass sheets whereby the wires are broken at the glass fractures.

8. Apparatus for cross cutting wire sheet glass, comprising in combination, means for applying a bending strain to sheet glass which has been cross scored, whereby the glass is fractured and divided into successive sheets, means for holding said successive sheets in alignment, and means for breaking the wire at the glass fracture to complete the cutting operation while the successive sheets are so held.

9. Apparatus for cross cutting wire sheet glass, comprising in combination, means for applying a bending strain to sheet glass which has been cross scored in a plurality of parallel lines whereby the glass is fractured at said lines and divided into successive sheets, means for holding the successive sheets in alignment, and means for breaking the wires at said glass at one of said fractures to complete the cutting operation while said successive sheets are so held.

10. Apparatus for cross cutting wire sheet glass comprising, in combination, means for moving sheet glass which has been cross scored, means effective while the glass is being moved for causing the glass to follow a tortuous path whereby said glass is fractured at the cross score and divided into successive sheets, and means effective on the moving glass for shifting the score portion intermediate the successive sheets to break the wires connecting said successive sheets, and means for holding the successive sheets in alignment during the wire breaking operation.

11. The invention set forth in claim 10 in which the tortuous path is provided by a pair of rollers, one on each side of the glass.

12. Apparatus for cross cutting wire sheet glass comprising, in combination, an upper roller, a lower roller, means for feeding between said rollers sheet glass which has been scored on a plurality of lines parallel to said rollers, means for changing the relative position of said rollers while the glass is passing therebetween to place a transverse strain on the glass where it has been scored to fracture the glass on said lines and divide the sheet into successive sheets, means effective on the moving glass for shifting the adjoining portions of the fractured sheet relative to each other, and means for holding the remaining portions of successive sheets in substantial alignment while the adjacent edges are being so shifted.

13. Apparatus for breaking the wires in sheet wire glass in which the glass has been cross fractured on a plurality of adjacent lines to divide the sheet into successive sheets comprising, in combination, means for supporting said successive sheets in substantial alignment, and means effective while the glass is being so supported for shifting portions of adjacent fractured edges relative to each other to break the wires between the edges.

14. Apparatus for breaking the wires in sheet wire glass in which the glass has been cross fractured on three closely spaced parallel lines, comprising in combination, means for firmly supporting said sheet adjacent said fractured lines, and means effective while so supported for moving said fractured edges relatively to each other whereby the wires between said edges are broken.

15. The invention set forth in claim 14 in which said moving means comprises a breaker bar and means for bringing said bar into forcible contact with the glass.

16. Apparatus for breaking the wires in sheet wire glass in which the glass has been cross fractured, comprising in combination, a pair of rollers side by side and normally free to rise, a breaker bar, means for moving the glass beneath said rollers and above said bar, means for forcing said bar into contact with the fracture when it is between and below said rollers, and means effective automatically upon actuation of said forcing means for preventing said rollers from rising from their normal positions.

17. A runway for use at the outlet end of a leer, comprising a series of rolls spaced along the runway in relatively fixed positions with respect to the length thereof, one of which rolls, located intermediate the ends of the runway, is mounted for vertical movement, and means for raising said roll so that its periphery lies above the level of the other rolls of the runway so as to apply pressure to the glass and cause it to crack.

18. Apparatus for cross cutting wire sheet glass comprising means for moving sheet glass which has been scored on a plurality of adjacent lines which consists in causing the glass to travel a tortuous path for fracturing the glass on said scored lines, means for supporting the sections of glass on opposite sides of said scored lines, and means for raising the glass intermediate said scored lines to sever the wires between the sections.

19. Apparatus for breaking the wires in sheet wire glass which has been cross fractured on closely spaced parallel lines comprising a pair of rollers arranged to engage the sections of glass on opposite sides of said scored lines, said rollers being normally free to accommodate inaccuracies in the glass, and means operating simultaneously for locking said rollers in contact with the glass and raising the glass between said sections to fracture the wires therein.

In testimony whereof we hereto affix our signatures.

GEORGE AURIEN.
PAUL F. GUTMANN.

DISCLAIMER 1,895,779.—*George Aurien* and *Paul F. Gutmann*, St. Louis, Mo. METHOD AND APPARATUS FOR CROSS CUTTING WIRE GLASS. Patent dated January 31, 1933. Disclaimer filed July 7, 1934, by the assignee, *Mississippi Glass Company*.

Hereby enters this disclaimer to that claim of the said Letters Patent No. 1,895,779 which is in the following words, to wit:

"17. A runway for use at the outlet end of a leer, comprising a series of rolls spaced along the runway in relatively fixed positions with respect to the length thereof, one of which rolls, located intermediate the ends of the runway, is mounted for vertical movement, and means for raising said roll so that its periphery lies above the level of the other rolls of the runway so as to apply pressure to the glass and cause it to crack."

[*Official Gazette August 7, 1934.*]

er bar and means for bringing said bar into forcible contact with the glass.

16. Apparatus for breaking the wires in sheet wire glass in which the glass has been cross fractured, comprising in combination, a pair of rollers side by side and normally free to rise, a breaker bar, means for moving the glass beneath said rollers and above said bar, means for forcing said bar into contact with the fracture when it is between and below said rollers, and means effective automatically upon actuation of said forcing means for preventing said rollers from rising from their normal positions.

17. A runway for use at the outlet end of a leer, comprising a series of rolls spaced along the runway in relatively fixed positions with respect to the length thereof, one of which rolls, located intermediate the ends of the runway, is mounted for vertical movement, and means for raising said roll so that its periphery lies above the level of the other rolls of the runway so as to apply pressure to the glass and cause it to crack.

18. Apparatus for cross cutting wire sheet glass comprising means for moving sheet glass which has been scored on a plurality of adjacent lines which consists in causing the glass to travel a tortuous path for fracturing the glass on said scored lines, means for supporting the sections of glass on opposite sides of said scored lines, and means for raising the glass intermediate said scored lines to sever the wires between the sections.

19. Apparatus for breaking the wires in sheet wire glass which has been cross fractured on closely spaced parallel lines comprising a pair of rollers arranged to engage the sections of glass on opposite sides of said scored lines, said rollers being normally free to accommodate inaccuracies in the glass, and means operating simultaneously for locking said rollers in contact with the glass and raising the glass between said sections to fracture the wires therein.

In testimony whereof we hereto affix our signatures.

GEORGE AURIEN.
PAUL F. GUTMANN.

DISCLAIMER 1,895,779.—*George Aurien* and *Paul F. Gutmann*, St. Louis, Mo. METHOD AND APPARATUS FOR CROSS CUTTING WIRE GLASS. Patent dated January 31, 1933. Disclaimer filed July 7, 1934, by the assignee, *Mississippi Glass Company*.

Hereby enters this disclaimer to that claim of the said Letters Patent No. 1,895,779 which is in the following words, to wit:

"17. A runway for use at the outlet end of a leer, comprising a series of rolls spaced along the runway in relatively fixed positions with respect to the length thereof, one of which rolls, located intermediate the ends of the runway, is mounted for vertical movement, and means for raising said roll so that its periphery lies above the level of the other rolls of the runway so as to apply pressure to the glass and cause it to crack."

[*Official Gazette August 7, 1934.*]

DISCLAIMER 1,895,779.—*George Aurien* and *Paul F. Gutmann*, St. Louis, Mo. METHOD AND APPARATUS FOR CROSS CUTTING WIRE GLASS. Patent dated January 31, 1933. Disclaimer filed July 7, 1934, by the assignee, *Mississippi Glass Company*.

Hereby enters this disclaimer to that claim of the said Letters Patent No. 1,895,779 which is in the following words, to wit:

"17. A runway for use at the outlet end of a leer, comprising a series of rolls spaced along the runway in relatively fixed positions with respect to the length thereof, one of which rolls, located intermediate the ends of the runway, is mounted for vertical movement, and means for raising said roll so that its periphery lies above the level of the other rolls of the runway so as to apply pressure to the glass and cause it to crack."

[*Official Gazette August 7, 1934.*]